No. 680,784. Patented Aug. 20, 1901.
W. J. KNOX.
PROCESS OF MANUFACTURING GAS.
(Application filed Nov. 12, 1900.)

(No Model.)

WITNESSES:
C. L. Belcher
Wm H Capel

INVENTOR
William John Knox.
BY
Charles A. Perry
ATTORNEY.

UNITED STATES PATENT OFFICE.

WILLIAM JOHN KNOX, OF PITTSBURG, PENNSYLVANIA, ASSIGNOR TO GEORGE WESTINGHOUSE, OF SAME PLACE.

PROCESS OF MANUFACTURING GAS.

SPECIFICATION forming part of Letters Patent No. 680,784, dated August 20, 1901.

Application filed November 12, 1900. Serial No. 36,265. (No specimens.)

*To all whom it may concern:*

Be it known that I, WILLIAM JOHN KNOX, a citizen of the United States, and a resident of Pittsburg, in the county of Allegheny and State of Pennsylvania, have invented certain new and useful Improvements in Processes for the Manufacture of Gas, of which the following is a specification.

My invention relates particularly to a process for the manufacture of gas, the invention being especially useful for the economical and efficient continuous process of producing gas. The broad features of the invention have, however, a wider application than to gas processes, as will be hereinafter pointed out.

The general plan of my invention is to maintain the requisite temperature in the gas-producers or other reacting vessels by circulating therethrough large quantities of gas heated to a proper temperature and to cause those portions of the system in which a continuous operative condition cannot be constantly maintained to be restored to their operative condition during the time that other portions of the system are in productive operation and to efficiently conserve the heat developed.

In another application filed by me October 5, 1900, Serial No. 32,115, I have described and claimed certain features which are described herein. In that application claims are made to the method of producing gas in which a heated volume of gas is passed into a producer, and the volume of gas is thus augmented and passed through a steam-generator, portions of the gas being withdrawn and the remainder reheated and recirculated, and in another application, Serial No. 36,269, filed November 12, 1900, claims are made to apparatus for carrying out the process above referred to. In still another application filed by me November 14, 1900, Serial No. 36,443, claims are made to the apparatus described herein.

The construction of the system and its operation will be described in connection with the accompanying drawings, in which—

Figure 1:
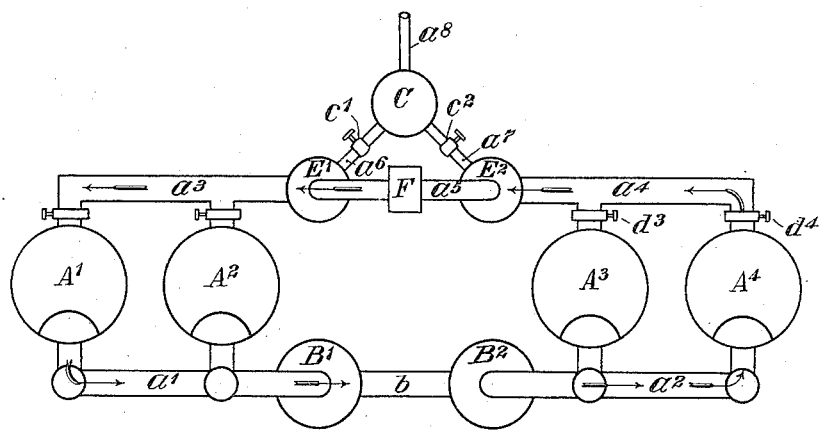
Figure 2:
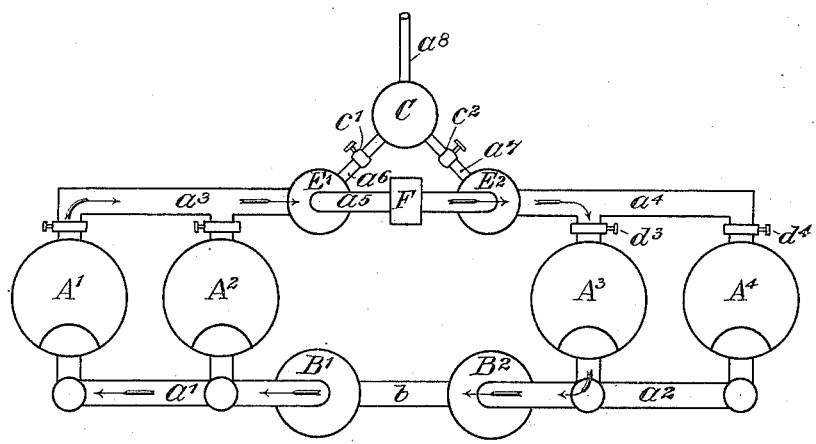

Figure 1 is a diagram showing the general arrangement of the apparatus and the circulation of the gases during one stage of the operation. Fig. 2 is a similar diagram showing the circulation of the gases during a succeeding stage of the operation.

Referring to the figures, $A'$ $A^2$ $A^3$ $A^4$ represent stoves of any suitable character, such as are usually employed in gas-producing apparatus for heating gases. They are provided with suitable brick surfaces for imparting the heat which has been previously stored in them by the combustion of fuel therein to the gases when they are circulating therethrough. The special construction of these stoves forms no part of the present invention, inasmuch as any efficient form of stove may be employed.

Two producers are represented at $B'$ and $B^2$, of any suitable well-known construction, and are connected together at their bottoms by a passage $b$. One end of each of the stoves $A'$ and $A^2$ is connected with a pipe $a'$, leading to the upper end of the producer $B'$. Corresponding ends of the stoves $A^3$ $A^4$ are connected with the pipe $a^2$, which leads to the top of the producer $B^2$. The ends of the stoves which are thus connected with the pipes $a'$ $a^2$ will be, for reasons which will presently appear, referred to in this specification as the "hot" ends of the stoves. The opposite ends of the stoves $A'$ $A^2$, called the "cold" ends, are connected by a pipe $a^3$ with a steam generator or evaporator $E'$, and the cold ends of the stoves $A^3$ $A^4$ are connected by a pipe $a^4$ with a similar steam generator or evaporator $E^2$. The steam-generators $E'$ and $E^2$ are connected with each other by means of a pipe $a^5$ through a suitable fan or blower F. They are also respectively connected by pipes $a^6$ and $a^7$ with a scrubber and water seal C, which is provided with an outlet-pipe $a^8$, designed to lead to a gas-holder or other suitable apparatus for receiving or consuming the gas.

For convenience in describing the operation of the apparatus it will first be assumed that the circulation of the gases therethrough has been established in some convenient manner.

Referring now particularly to Fig. 1, the stove $A'$ is hot, having been previously heated by the combustion of fuel in a manner well understood. This fuel may be either a quantity of gas produced in the system or obtained from an outside source. A quantity of gas derived from the producers is forced by the fan F through the steam-generator $E'$, thence through the pipe $a^3$ to the cold end of the stove $A'$, out through the hot end, thence through the pipe $a'$ to the upper end of the producer $B'$. A suitable supply of steam is added to the gas from the evaporator $E'$ either before it enters the producer or within the producer, as found convenient. When the steam comes in contact with the coke with which the producer $B'$ is charged, water-gas is produced in the usual manner. The augmented volume of gas from the bottom of this producer $B'$ passes through the pipe $b$ to the bottom of the producer $B^2$ which is being charged with bituminous coal. This gas is still very hot and passing upward through the producer $B^2$ it distils the hydrocarbons from the coal, gradually reducing it to coke. The water-gas, with the added hydrocarbon gases, then leaves the producer $B^2$ at its upper end and passes through the pipe $a^2$ to the hot end of the relatively cold stove $A^4$. This stove, however, still retains more or less heat, because of its having been a hot stove in the previous operation. The gases passing into the hot end and out of the cold end of this stove lose much of their heat as they go, and the hydrocarbons passing over the hot bricks will be fixed into permanent gases. They pass thence to the steam generator or evaporator $E^2$ by way of pipe $a^4$, where much of the remaining heat is utilized in raising steam for making the water-gas. The fan F meanwhile is being operated in any convenient manner to force the gases forward through the pipe $a^5$ and the steam-generator $E'$. A portion passes out of the system through the pipe $a^6$ and the water seal C, the pipe $a^7$ being meanwhile closed by a valve $c^2$. The balance of the gas passes on to the stove $A'$ and repeats its cycle, as already described. This operation is continued, more gas being constantly produced than is circulated, the excess passing off to the holder until the stove $A'$ has become cooled below the efficient gas-making temperature. As the coke in the producer $B'$ is gradually consumed coal is added to the top of the producer $B^2$, so that at the end of the run the producer $B'$ is empty and the producer $B^2$ is filled with coke, its charge of coal having been now reduced to coke. The direction of the fan F is then reversed, the valve $d^4$ in the pipe leading from the cold end of the stove $A^4$ to the pipe $a^4$ is closed, the valve $d^3$ in the pipe leading from the stove $A^3$ to the pipe $a^4$ is opened, the valve $c'$ in the pipe $a^6$ is closed, and the corresponding valve $c^2$ in the pipe $a^7$ is opened. Then the circulation will be, as shown in Fig. 2, from the fan through the stove $A^3$, down through the producer $B^2$ now charged with coke, up through the producer $B'$, which is being charged with coal, thence through the relatively cold stove $A'$ and the pipe $a^3$ to the steam-generator $E'$, thence through the fan and the steam-generator $E^2$, a portion then passing out through pipe $a^7$ and the remainder continuing the circulation. Meanwhile the stoves $A^2$ and $A^4$ are being brought to a high temperature by the combustion of fuel, each stove being heated during the two previous runs. In the next cycle the stoves $A^2$ and $A^3$ will be in use and the stoves $A'$ and $A^4$ will be heating. The continuation of the process, whereby each stove is used in succession as the heating-stove and as the fixing-stove, will be apparent from the description already given.

It may be stated in general terms that the economy of the system is dependent upon the lowness of the temperature of the escaping products of combustion of the fuel employed in heating the stoves, and it is therefore especially important that the temperature of the cold end of the stoves from which the products of combustion of fuel employed for heating them escape shall be at all times as low as practicable. For this reason the gases which are circulated through the stoves to the producers should be cooled before passing into the stoves, for the cold ends of the stoves will have the temperature of the gases entering them, and thereafter when the stove is being heated by the combustion of fuel the products of combustion will have their heat absorbed in the stove until they reach the cold end and, passing out to the flues, will be of practically the same temperature as the cold end. If the gases were circulated directly from the producer to the heating-stove without being cooled, then the cold end of the heating-stove would be raised in temperature to such an extent that when the stove was afterward being heated up by the combustion of fuel the outgoing products of combustion would be at such a temperature as to carry off and waste an excessive amount of heat.

The heat which is taken out of the gases by the steam-generators is not lost, but is stored up in the steam, and thus is retransferred to the producers. That portion of the gas which is being constantly drawn off and passed to the holder is still further cooled by passing through the scrubber C, and the hot water may be pumped from this scrubber to the steam-generators $E'$ $E^2$.

In general it is desirable that the outgoing end of the producer should be kept at as nearly the same temperature as its ingoing end as practicable. Therefore the temperatures of the gases passing from a producer must be high, and hence it follows that the stoves and steam-generators must be so organized as to absorb as much as possible of this heat and deliver it back again in some form to the producer. If it were practicable to so make the producer that the gases should leave it at a low temperature, then it would not be necessary to pass the gas through a steam-generator or other heat-conserver, for it could then be made to enter the end of the heating-stove at the minimum temperature, and thus keep that end of the stove cool. The stoves, on the contrary, should, for the reasons already given, be as cool at the cold end as practicable and sufficiently hot at the other end to give the requisite temperature to the producer, and, furthermore, by having one end cold and the other hot they give off their heat to the gas passing through them in an economical manner, because the difference in temperature between the gas and the surfaces of the brick with which they come in contact is approximately a constant factor throughout the entire length of the stove, and thus the stove yields heat uniformly to the gas throughout its entire length.

It has been heretofore proposed to superheat steam outside of the producers and to use the steam not merely as a constituent for forming water-gas, but also for conveying into the producer sensible heat for delivery to the producer; but the heat which it is practicable to carry into the producer by means of the steam alone as a carrier is not sufficient to replace the heat absorbed by the chemical change required to produce water-gas. It has also been proposed to carry heat into the producer by circulating therethrough quantities of the produced gas previously heated by stoves. I secure the heat required by using sufficiently-large volumes of produced gas heated to the proper temperature and mingled with the heated steam to act as a carrier for the heat-units required to convert the entire mass of coke and its equivalent of steam into water-gas when once the operation has commenced without the necessity of stopping the operation and the reheating of the coke by other means.

By mingling the gas and the steam together, and thus diluting the steam before attacking the coke, I secure a very important result—namely, an increase in the rate of dissociation. The steam is more evenly distributed throughout the entire mass of the coke, and because of the mechanical separation of its molecules by the gas the decomposition and the formation of the water-gas is more rapid and is also effected at a lower temperature than is required when pure steam is employed. This results, therefore, not merely in the more even and rapid formation of the water-gas and even temperature on the part of the coke, but it also renders it possible to work with lower temperatures than where steam alone is employed. The reduction in temperature thus secured is a feature of much importance, because the higher the temperature dealt with the greater is the difficulty experienced with the valves and other parts of the apparatus.

By passing large quantities of heated gas mingled with the steam into the producer containing coke the temperature at the outgoing terminal can be maintained very nearly the same as that at the ingoing terminal, and thus the heat of the circulating gas and the newly-produced water-gas as it passes to the producer containing coal is sufficient to operate very effectively upon the coal and distil out the hydrocarbons. It should be noted also that as the coke is gradually reduced by the formation of water-gas in the first producer the coal in the lower end of the second producer is being transformed into coke, so that there is an approximately uniform amount of coke exposed to the action of the steam for the formation of water-gas, and when the coke in the first producer has been practically consumed the coal in the second producer is practically all reduced to coke, and this will be still very highly heated owing to the heat-carrying capacity of the circulating gas, so that the latter producer is now in proper heated condition for being used as a water-gas producer when the direction of the current of gas and steam is reversed.

In the foregoing description I have referred to the apparatus as including economizers $E'$ $E^2$ in the circuit. I wish to have it distinctly understood, however, that it is not always necessary to employ economizers or steam-generators, such as $E'$ $E^2$, for by properly proportioning the stoves $A'$ $A^2$ the stoves themselves may be made to abstract from the gas and to conserve sufficient of the heat to render the apparatus highly economical and efficient without the aid of the supplemental devices or steam-generators $E'$ $E^2$. It will be now understood that by increasing the size of the stoves the temperature of the gas passing through a stove from the producers may be lowered in the stove to such a degree that it will pass out from that stove at the desired low temperature and the cold end of each stove maintained at the requisite temperature. It will be understood, further, that whether the steam-generators $E'$ $E^2$ are used or not the stoves $A'$ $A^2$ act as economizers. One way of viewing the economizers $E'$ $E^2$ is to regard them as extensions of the stoves, although they have the additional function when used of generating steam.

In some uses of my invention steam may not be necessary, and even in cases where steam is necessary I sometimes prefer to supply the steam from a separate source and omit the steam-generators $E'$ and $E^2$. For instance, in using the invention for the generation of water-gas from wood, garbage, &c., containing water in any form the material being converted will furnish the necessary steam to the system. Again, in some operations to which the invention is applicable steam is not necessary—as, for instance, in the production of bituminous gas and in the production of carbonic-acid gas from limestone. In this latter case the fundamental principle of operation is essentially that already described, limestone being placed in the producers and heat being conveyed by a circulation of the evolved gas, and the circulating gas being raised to its maximum and reduced to its minimum temperature through the heat cycle, a portion being drawn off corresponding to that given off in the producers or reacting vessels. It is also to be understood that two producers $B'$ $B^2$ are not always necessary, as a single producing device may be advantageously employed with the heat cycle or in some cases more than two may be used.

By the expression "heat cycle" I refer to the general principle of causing the circulating gas to be heated to a maximum working temperature and then sent through the producers or reacting vessels, then cooling to a minimum temperature by passing through in a reversed direction a vessel equivalent to the heating device and yielding thereto the excess of heat from the reacting vessel, then raising the gas again to its maximum temperature, and also the reversal of this operation, whereby the heating device becomes the heat-absorbing device and the former heat-absorbing device becomes the heating device, the heat which has been stored up therein being yielded back to the circulating gas. It should be noted that it is advantageous that the two heating or heat-absorbing devices should be of approximately equivalent capacities to obtain the best results.

The invention claimed is—

1. The hereinbefore-described method of manufacturing gas, which consists in forcing heated gas and steam downward through a coke-containing producer and upward through a coal-containing producer, thereby generating water-gas in the first and distilled gas in the second producer, thereby consuming coke in the first-named producer and producing coke in the second-named producer, and periodically reversing the direction of circulation therethrough.

2. The hereinbefore-described method of manufacturing gas which consists in forcing heated gas and steam downward through one producer containing coke, and upward through a second producer containing coal, consuming the coke in the first-named producer in the formation of water-gas, transforming coal into coke in the second-named producer by the formation of distilled gas.

3. The method of manufacturing gas which consists in forcing heated gas and steam downward and upward, respectively, through two connected producers and generating water-gas in one and distilled gas in the other, and periodically reversing the direction of circulation.

4. The hereinbefore-described process of manufacturing gas which consists in heating a portion thereof to a high temperature, transmitting the same through a producer, artificially cooling the gas to a mimimum temperature, conserving the heat thus artificially withdrawn, withdrawing a volume of gas approximately equal to that being developed in the producer, reheating the balance to a maximum temperature and repeating the cycle.

5. The hereinbefore-described process of manufacturing gas which consists in alternately raising to a maximum temperature and cooling to a minimum temperature a determined volume of the produced gas, and circulating the same through the producer at its maximum temperature and into the heater at its minimum temperature.

6. The hereinbefore-described process of producing gas, which consists in circulating a predetermined amount of gas through a heating apparatus, delivering the same to a producer, simultaneously supplying steam to the producer, generating in the producer additional gas, cooling the gas as it passes from the producer, conserving the heat thus abstracted from the gas, forcing a portion thereof to repeat the before-described circulation, and consuming a portion of the gas to reheat the circulating portion.

7. The hereinbefore-described process of generating gas, which consists in heating a portion thereof and circulating the same through a producer and cooling devices, thereby alternately raising the same to a maximum temperature and cooling it to a minimum temperature, and utilizing a portion thereof to develop heat and storing such heat at one point while previously similarly stored heat is being utilized at another point for raising gas to its maximum temperature.

8. The method of conveying heat by means of gaseous fluids, which consists in alternately raising to a maximum temperature and cooling to a minimum temperature a determinate volume of gaseous fluid, by circulating the same through a heating device, thereby giving to it its maximum temperature, delivering the same to the apparatus to be heated, then positively cooling the gas, thereafter reheating it, and repeating the cycle.

9. The method of conveying heat by means of gaseous fluids through a closed system, and conserving heat in the system, which consists in circulating the volume of gas through the system, heating the gas at one point, utilizing a portion of the heat at another point, cooling the gas at a third point, conserving the heat thus abstracted from the gas at the third point, passing the cooled gas to the heating-point, and continuing the circulation.

10. The method of conveying heat by means of gaseous fluids through a closed system and conserving heat in the system, which consists in circulating the volume of gas through the system, heating the gas at one point, utilizing a portion of the heat at another point, cooling the gas at a third point, conserving the heat thus abstracted from the gas at the third point, passing the cooled gas to the heating-point and continuing the circulation, and periodically reversing the direction of the circulation of the gas and coincidently reversing the position of the heating and cooling points.

Signed at Pittsburg, in the county of Allegheny and State of Pennsylvania, this 7th day of November, A. D. 1900.

WILLIAM JOHN KNOX.

Witnesses:
J. A. ADAMS,
R. J. BRATTON.